United States Patent [19]

Dusbiber

[11] 3,979,126
[45] Sept. 7, 1976

[54] BALL AND PROCESS AND COMPOSITION OF MATTER FOR PRODUCTION THEREOF

[75] Inventor: Warren M. Dusbiber, Plymouth, Mich.

[73] Assignee: Acushnet Company, New Bedford, Mass.

[22] Filed: Jan. 10, 1973

[21] Appl. No.: 322,296

Related U.S. Application Data

[63] Continuation-in-part of Ser. No. 110,313, Jan. 27, 1971, abandoned, which is a continuation-in-part of Ser. No. 856,890, Sept. 2, 1969, abandoned, which is a continuation of Ser. No. 434,227, Feb. 23, 1965, abandoned.

[52] U.S. Cl. ............................ 273/218; 260/31.8 R; 260/31.8 C; 260/37 N; 260/998.14; 273/235 R; 273/DIG. 8
[51] Int. Cl.² ..................... A63B 37/00; C08K 5/11; C08K 5/12; C08L 75/08
[58] Field of Search ..................... 273/218, 235 R; 260/998.14, 31.8 R, 31.8 C, 31.6, 37 N

[56] References Cited

UNITED STATES PATENTS

| | | | |
|---|---|---|---|
| 2,729,618 | 1/1956 | Muller et al. | 260/75 TN |
| 3,238,156 | 3/1966 | Kohrn | 260/998.14 |
| 3,395,109 | 7/1968 | Molitor et al. | 260/998.14 |
| 3,647,221 | 3/1972 | Holley | 273/218 |

*Primary Examiner*—Allan Lieberman
*Attorney, Agent, or Firm*—Eyre, Mann, Lucas & Just

[57] ABSTRACT

A solid plastic polyurethane golf ball is disclosed. The golf ball comprises a polyether urethane prepolymer with a curing agent.

14 Claims, No Drawings

BALL AND PROCESS AND COMPOSITION OF MATTER FOR PRODUCTION THEREOF

The present application is a continuation-in-part of U.S. Application Ser. No. 110,313 filed Jan. 27, 1971 which in turn was a continuation-in-part of Application Ser. No. 856,890 filed Sept. 2, 1969 which in turn was a streamlined continuation of Application Ser. No. 434,227 filed Feb. 23, 1965, all now abandoned.

The invention relates to golf balls and refers more specifically to a process for manufacturing synthetic elastomeric golf balls having predetermined properties, the composition of matter from which the golf balls are manufactured and the resulting golf balls.

In the past golf balls have usually been constructed by wrapping thin bands of rubber about a spherical core and subsequently encasing the core and rubber wrappings in a spherical plastic shell. Such manufacture requires a plurality of separate individual steps and complicated machinery. The manufacturing of golf balls has therefore in the past been time consuming and expensive.

In addition it has been difficult with prior manufacturing processes and materials to produce golf balls which are perfectly round and which have the requisite rebound, click and color. Further, prior balls have not been particularly rugged and may be easily cut if not hit squarely which immediately produces an out-of-round condition in the cut ball.

In accordance with the present invention these disadvantages are overcome by forming a golf ball from a composition comprising a polyether urethane prepolymer and a curing agent selected from the group consisting of trifunctional and tetrafunctional polyols and amine-type curing agents having at least two amine groups. The prepolymer and the curing agent are mixed in a mole equivalent ratio of 1:1 ± 20%. Additional materials such as catalysts, colorants, ultraviolet light absorbers, plasticizers, and co-curing agents may also be included if desired.

The golf balls of the present invention can be used as regular competition golf balls if desired, but their primary use is in so-called "range balls." This is because of their outstanding durability and cut resistance and because they can be easily and relatively inexpensively made to travel a lesser distance than standard golf balls while still imparting good "click" and "feel." Those skilled in the art will appreciate that it is generally desired that range balls not travel as far as regular golf balls since ranges, especially in urban areas, have become smaller and smaller due to the high price of land. While some regular golf balls can be modified to give the lesser distance desirable in range balls, this is usually done at the expense of good "click" and "feel." The golf balls of the present invention, on the other hand, can be made into good range balls while retaining good "click" and "feel" which makes them highly acceptable to golfers.

While it is preferred that the golf ball of the present invention be made in one piece with the composition of the present invention throughout, it will be understood that the composition of the present invention may also be used in two or more piece golf balls. The composition of the present invention may be used for the core or for the cover of such balls as desired but where a two or more piece golf ball is made, the composition of the present invention is preferably employed in the core.

The golf ball is a solid ball of less than 1.70 inches in diameter constructed of a composition of matter according to the present invention. This will ordinarily comprise approximately one hundred parts by weight of a polyether urethane prepolymer and about three to about twelve parts by weight of a curing agent. Up to about one hundred parts by weight of a compatible plasticizer and up to about one hundred parts by weight of a filler and/or colorant along with up to two parts by weight of an ultraviolet light absorber and up to ten parts by weight of an internal lubricant may be added to the curing agent. In addition up to one part by weight of a catalyst may be added to the urethane prepolymer before mixing the prepolymer with the curing agent. Glass or powdered metals, minerals or resins may be added to the composition of material to improve the hardness thereof.

The process by which the golf ball is manufactured includes mixing the urethane prepolymer and the curing agent along with the desired additives after they have been degassed to remove moisture therefrom as by vacuum degassing or the like, filling the halves of a two-part golf ball mold with the mixed urethane prepolymer and curing agent and curing the mixture at room temperature for approximately three weeks. Alternatively the urethane prepolymer may be preheated to approximately 200°F. and the curing agent may be heated to between 250°F. and 300°F. before mixing. Also, the curing may be accomplished with up to one hour curing at 200°F. in the mold and approximately two hours curing at 200°F. out of the mold. Two weeks final curing at room temperature may follow the curing out of the mold.

The polyurethanes which are useful in the practice of the present invention are the urethane prepolymers made from polyethers with diisocyanates. Although any diisocyanate may be employed, the preferred diisocyanates are 2,4 tolylene diisocyanate (TDI), 4,4' diphenylmethane diisocyanate (MDI), and 3,3' dimethyl 4,4' biphenylene diisocyanate (also known as 3,3' dimethyl 4,4' biphenyl diisocyanate) )TODI). The polyether part of the prepolymer is preferably a polyalkylene ether glycol having an average molecular weight of less than 1,000 and having from about 4 to about 8 carbon atoms in the alkylene group. Best results have been obtained with polytetramethylene ether glycol. It is important that only polyether prepolymers be employed. Polyester urethane prepolymers are unsatisfactory because of their high hydrolysis constant. When golf balls are made from polyester urethanes they are eminently unsatisfactory.

The prepolymer is cured with either a polyol or an amine-type curing agent. The polyol curing agent may be trifunctional or tetrafunctional. It is important to note that the curing agent may not be a difunctional polyol since difunctional polyols do not result in a golf ball which has the advantages of the present invention. Examples of polyol-type curing agents useful in the practice of the present invention are triisopropanol amine (TIPA) and trimethylol propane (TMP). Best results have been obtained with the TMP. As to the amine-type curing agents, there must be at least two amine groups present and best results have been obtained with aromatic diamines. Typical amine-type curing agents which are useful in the practice of the present invention are: 3,3' dichlorobenzidene; 3,3' dichloro, 4,4' diamino diphenyl methane (MOCA); N,N,N', N' tetrakis (2-hydroxy propyl) ethylene diamine (sold by Wyandotte under the trade name Quadrol); and Curalon L which is Uniroyal Inc.'s brand name for a mixture of aromatic diamines.

In forming the golf balls of the present invention the prepolymer and the curing agent are mixed in an equivalent weight ratio of 1:1 ± 20% and best results have been obtained with an equivalent weight ratio of 1:1 ± 10%. The amount of curing agent to be added is computed in the following formula:

$$C = \frac{(E_c)(\%I)}{(E_i)}$$

wherein:
C = the parts of curing agent to be employed per 100 parts of prepolymer;
$E_i$ = the equivalent weight of the isocyanate linkage in the prepolymer (which will be 42.0);
$\%I$ = the percentage by weight of available isocyanate in the prepolymer; and
$E_c$ = the equivalent weight of the curing agent (determined by dividing the molecular weight of the curing agent by the number of sites available for curing).

The above formula will result in an equivalent weight ratio of 1:1 for curing agent to prepolymer. The amount of curing agent may then be varied up to 20% in either direction.

EXAMPLE 1

| 100 | parts by weight Adiprene L-100 | Basic elastomer |
|---|---|---|
| .25 | parts by weight Adipic Acid | Catalyst |
| 9.5 | parts by weight CBU | Curing agent |
| 20. | parts by weight KP-260 | Plasticizer |
| 20. | parts by weight pigment and/or filler | Colorant |
| .2 | parts by weight Tinuvin P | Ultraviolet light absorber |
| .5 | parts by weight glycol wax 932 | Internal lubricant |

The Adiprene L-100 is a polyether urethane prepolymer, isocyanate terminated, containing 4.0 to 4.3% isocyanate groups by weight, such as is disclosed in U.S. Pat. No. 3,034,791, and is commercially obtainable from E. I. DuPont De Nemours & Co., Elastomer Chemicals Dept., Wilmington, Del. The urethane elastomers are known. The particular Adiprene urethane prepolymer is based on poly-(oxytetramethylene) glycols. Adiprene L-420, available from the same source as Adiprene L-100, may also be used in the manufacture of the golf ball to produce a golf ball having a greater rebound but providing a lower flexural modulus.

The catalyst is added to the urethane prepolymer to promote the reaction of the urethane prepolymer with the curing agent. Specifically the catalyst may be Adipic acid which is commercially obtainable from any laboratory supply house.

The CBU which is a commercial designation of 3,3' Dichlorobenzidine is commercially available from the Carwin Company, North Haven, Conn. The CBU, an organic diamine, is a curing agent capable of reacting with the available isocyanate groups in the urethane prepolymer to form a strong rubbery solid. For easier handling the CBU may be dissolved or dispersed in a plasticizer, if one is used.

The plasticizer may be KP-260 (2-ethylhexyl diglycolate) or DOP (di-2 ethylhexyl phthalate), commercially obtainable from the Food Machinery & Chemical Corp., Chemicals and Plastic Division, 161 East 42nd Street, New York 17, N.Y. The KP-260 plasticizer holds the CBU curing agent in solution so that it is easy to work with. The plasticizer improves the resilience of the manufactured golf ball to aid in the bounce thereof and is a relatively inexpensive additive.

The colorant is not absolutely necessary but may provide golf balls of a desired color, such as a clean blue-white provided by a titanium dioxide white paste. The colorant may be specifically White Paste No. 22961, commercially obtainable from the Crompton & Knowles, Plastics Color Division.

To prevent degradation and discoloration of the finished golf ball on aging due to exposure to heat and sunlight, an ultraviolet light absorber, such as Tinuvin P2(2'-hydroxy 5'-methylphenyl) benzotriazole) which is commercially obtainable from Geigy Industrial Chemicals, Saw Mill River Road, Ardsley, New York is added to the composition of matter set forth above.

An internal lubricant may be added to produce better mold release and a desired feel for the finished golf ball. High molecular weight glycols, such as Glycol Wax 932 and Carbowax 4000, are suitable internal lubricants.

MOCA (4,4'-methylene-bis-(2-chloroaniline)) produced by E. I. DuPont De Nemours & Co., Organic Chemical Department, may be substituted for the CBU as a curing agent, if desired. The MOCA, added to Adiprene L-420 in less than the standard reaction ratio as indicated in the above quantities, produces a golf ball having an acceptable flexural modulus.

To obtain the desired cut resistance and increased flexural modulus and hardness, additives, such as aluminum powder or glass beads may be added to the composition of matter indicated above. The glass beads may increase the specific gravity of the finished golf ball in what will sometimes be an undesirable amount. Hollow glass beads may be used to bring the specific gravity of the manufactured golf ball back to the desired specific gravity.

The golf ball may be manufactured by mixing the urethane prepolymer and curing agent at room temperature or at an elevated temperature together with the additives indicated above in the quantities specified. The mixture will have a relatively short pot life of, for example two or three times. After a short time the mixture will turn into a gel which is formable and which may be pressed in the mold halves. The time to gel condition can be controlled by the presence and the amount of the catalyst, the ratio of the curing agent to the prepolymer and by the temperature of the reactants. The mixed urethane prepolymer and curing agent together with the additives may then be cured for approximately three weeks at room temperature.

If it is desired to reuse the mold halves at frequent intervals the urethane prepolymer may be heated to between 200°F. and 220°F. together with the catalyst if one is to be used. The curing agent and the additives, such as the plasticizer, colorant, ultraviolet light absorber and internal lubricant may be heated to between 250°F. and 300°F., after which the urethane prepolymer and curing agent mixtures are mixed together and deposited in a mold. The curing may then be accomplished for approximately one hour at 200°F. with the golf ball in the mold and is continued at 200°F. for approximately two hours with the golf ball out of the mold. Subsequently curing may be finished at room temperature for approximately fourteen days. Alternatively the mixture may be deposited in the mold by rotational casting, centrifugal casting, vacuum casting, injection, transfer or compression molding methods.

If even more rapid reuse of the mold halves is desired, a composition of material comprising 100 parts Adiprene L-100, 34 parts diallyl phthalate plasticizer, 4.5 parts Metaphenylene diamine curing agent and 10 parts colorant which may be titanium dioxide paste may be used. The reactants are mixed at 150°F. and are cured in the mold for five minutes and out of the mold for two weeks at room temperature.

Both the urethane prepolymer and the curing agent together with their additives may in any case be degassed. This can be accomplished with vacuum degassers which are commercially available. Without degassing the urethane prepolymers which are susceptible to moisture may not react sufficiently to provide a golf ball with desired properties. Processing of materials for production type operations can be accomplished with commercial machines that heat, mix, meter and dispense the mixture on demand. The degassing operation can also be included in the processing steps.

The following are further examples of golf balls prepared in accordance with the present invention.

EXAMPLE 2

One hundred parts by weight of Adiprene L-100 was heated at 100°C., adipic acid (0.125 parts), Tinuvin P (0.2 parts), Crobowax 4000 (0.5 parts) were then added with mixing, followed by the addition of diallyl phthalate (50 parts); the mixture was again heated to 100°C., and 12 parts of molten dichlorobenzidine at 120°C. was then added with mixing. The liquid mixture was poured into a golf ball mold at 115°C. and held at this temperature for 45 minutes. The cast ball was then firm enough to be separated from the mold; it was removed and cured at 104°C. for five hours. The resultant golf ball was tough in texture and had good resiliency.

EXAMPLE 3

One hundred parts by weight of Adiprene L-83 was heated to 100°C. Adiprene L-83 is a urethane prepolymer, isocyanate terminated, containing 3.1 to 3.4% available isocyanate by weight, and is commercially obtainable from E. I. DuPont de Nemours & Co., Elastomer Chemicals Dept. Wilmington, Del. Oleic acid (0.8 parts) was added, with mixing, followed by molten MOCA (4,4' methylene bis (2 chloroaniline)) (10.5 parts) which had been previously heated to 120°C. The liquid mixture was poured into a golf ball mold (preheated to 115°C.) and held at this temperature for 45 minutes. The case ball was now firm enough to be separated from the mold. It was removed and cured at 104°C. for 5 hours, giving a strong, resilient golf ball.

EXAMPLE 4

One hundred parts by weight of Adiprene L-83 was heated to 100°C. Oleic acid (0.1 parts), Nuocure 28 catalyst (0.6 parts) and Adipol BCD (dibutoxyethyl adipate) (10.0 parts) were then added, with mixing and heated to 100°C. Curithane 126 (dichlorobenzidine) (11.0 parts) was melted at 121°C. and mixed in. The liquid mixture was poured into a golf ball mold (preheated to 115°C.) and held at this temperature for 45 minutes. The cast ball was then removed from the mold and cured at 104°C. for 5 hours, giving a tough, resilient golf ball.

EXAMPLE 5

One hundred parts by weight of Adiprene L-167 was heated to 100°C. Adiprene L-167 is a urethane prepolymer, isocyanate terminated, containing 6.15 to 6.55% available isocyanate by weight, and is obtainable from E. I. DuPont de Nemours & Co., Elastomer Chemicals Dept., Wilmington, Del. Adipic acid (0.125 parts), Tinuvin P (ultraviolet light absorber) (0.2 parts), Carbowax 4000 (0.5 parts), and dioctyl adipate (50 parts) were added with mixing action. The temperature was raised to 100°C. and molten MOCA (4,4' methylene bis (2 chloroaniline)) (20 parts) at about 120°C. was poured in with mixing. The liquid mixture was poured into a golf ball mold pre-heated to 115°C. and was held at this temperature for 45 minutes. Thereafter, the molded ball was removed from the mold and cured for 5 hours at 100°C. The ball was hard and had moderate resiliency.

EXAMPLE 6

One hundred parts by weight of Adiprene L-100 was mixed with oleic acid (1.2 parts), Nuocure 28 catalyst (0.6 parts) and titanium dioxide paste (1.8 parts). The mixture was heated to 100°C. Dichlorobenzidine (11.2 parts) was dissolved in di(butozyethozyethyl) formal (29.2 parts) which was heated to 100°C. and added to the prepolymer with mixing. The liquid mixture was poured into a golf ball mold, pre-heated to 115°C., and then held at this temperature for 45 minutes. After demolding, the ball was cured at 104°C. for 5 hours. The resultant golf ball was tough in texture and had good resiliency.

EXAMPLE 7

666 grams of Polymeg 2000 (polytetramethylene ether glycol, available from Quaker Oats Company, Chemicals Division, Chicago, Ill.) was reacted at 45°–80°C. with 122 grams of Hylene TM (mixed 2,4- and 2,6-toluene diisocyanates, available from E. I. DuPont de Nemours & Co., Elastomer Chemicals Dept., Wilmington, Delaware) over 5 hours. One hundred parts of the product was mixed with adipic acid (0.125 parts), titanium dioxide (20.0 parts), Carbowax 4000 (0.5 parts), Tinuvin P (0.2 parts) and diallyl phthalate (20.0 parts) and heated to 100°C. MOCA (4,4' methylene bis (2 chloroaniline)) (9.5 parts) at 120°C. was added to the mixture with mixing and the liquid was poured into a golf ball mold, pre-heated to 115°C. and then held at this temperature for 40 minutes. After de-molding, the resultant ball was cured at 104°C. for 5 hours. It had good resiliency.

EXAMPLES 8–15

In the following examples the following trademarks are employed:

| TRADEMARK | AVAILABLE FROM | DESCRIPTION |
|---|---|---|
| Adiprene L-100 | DuPont | 4.1% free isocyanate |
| Adiprene L-213 | DuPont | 9.5% free isocyanate |
| TP 90-B | Thiokol | dibutoxyethoxyethyl formal |
| Nuocure | Nuodex | stannous octoate |
| White Paste 22961 | Crompton & Knowles | white pigment suspension (72% solids) |
| Curithane 126 | Carwin | 3,3'-dichlorobenzidine |
| MOCA | DuPont | 3,3'-dichloro-4,4'-diamino-diphenyl methane |
| Adiprene L-315 | DuPont | 9.45% free isocyanate |
| Adiprene L-167 | DuPont | 6.30% free isocyanate |
| Adiprene L-955 | DuPont | 8.15% free isocyanate |
| Adiprene 420 | DuPont | 2.8% free isocyanate |
| DBEA | Reichhold | dibutoxyethyl adipate |

In each of these examples the following procedure for preparation of a golf ball was used.
1. The prepolymer resin was warmed to a temperature of about 200°F. and placed in a vacuum oven for degassing.
2. The curing agent was melted at a temperature of about 200°–250°F., the fillers, catalysts and other materials were admixed therewith and the admixture was placed in the vacuum oven for degassing.
3. The prepolymer resin and the admixture of the curing agent and other ingredients were combined and thoroughly mixed without entraining air and the resultant composition was transferred quickly to a prewarmed mold.
4. The mixture in the mold was allowed to cool to room temperature and then the golf ball was removed. Post aging at room temperature for a period of at least three days was employed.

The balls which are suitable in accordance with the present invention have a PGA Compression above 25 and preferably above 30. The durometer on the Shore C Scale should be at least 60. The rebound on the standard 72 inch rebound test should be at least 48 inches. On the standard United States Golf Association Driving Machine the initial velocity of the ball should be at least 230 feet/second.

EXAMPLE 8

| PRODUCT | PARTS | FUNCTION |
|---|---|---|
| Adiprene L-100 | 100.00 | urethane prepolymer |
| TP 90-B | 29.2 | plasticizer |
| Oleic Acid | 1.2 | cure retarder |
| Nuocure 28 | 0.6 | catalyst |
| White Paste 22961 | 1.8 | colorant |
| Curithane 126 | 11.2 | curing agent |

In accordance with the formula given on page six the equivalent mole ratio of isocyanate to curing agent is 1.09:1.

The golf ball made from the above formulation had the following physical characteristics:

| PGA Compression | 52 |
|---|---|
| Shore C Durometer | 60 |
| 72" Rebound | 49" |
| Initial Velocity (feet/second) | 234 |

EXAMPLE 9

| PRODUCT | PARTS | FUNCTION |
|---|---|---|
| Adiprene L-213 | 100.00 | urethane prepolymer |

EXAMPLE 9-continued

| PRODUCT | PARTS | FUNCTION |
|---|---|---|
| MOCA | 25.00 | curing agent |

In accordance with the formula given on page six the equivalent mole ratio of isocyanate to curing agent is 1.21:1.

The golf ball made from the above formulation had the following physical characteristics:

| PGA Compression | 174 |
|---|---|
| Shore C Durometer | 92 |
| 72" Rebound | 53" |
| Initial Velocity (feet/second) | 237 |

EXAMPLE 10

| PRODUCT | PARTS | FUNCTION |
|---|---|---|
| Adiprene L-315 | 100.00 | urethane prepolymer |
| MOCA | 26.00 | curing agent |

In accordance with the formula given on page six the equivalent mole ratio of isocyanate to curing agent is 1.16:1.

The golf ball made from the above formulation had the following physical characteristics:

| PGA Compression | 157 |
|---|---|
| Shore C Durometer | 95 |
| 72" Rebound | 53" |
| Initial Velocity (feet/second) | 237 |

EXAMPLE 11

| PRODUCT | PARTS | FUNCTION |
|---|---|---|
| Adiprene L-213 | 100.00 | urethane prepolymer |
| MOCA | 25.00 | curing agent |

In accordance with the formula given on page six the equivalent mole ratio of isocyanate to curing agent is 1.12:1.

The golf ball made from the above formulation had the following physical characteristics:

| PGA Compression | 153 |
|---|---|

EXAMPLE 12

| PRODUCT | PARTS | FUNCTION |
|---|---|---|
| Adiprene L-955 | 100.00 | urethane prepolymer |
| MOCA | 26.00 | curing agent |

In accordance with the formula given on page six the equivalent mole ratio of isocyanate to curing agent is 1.12:1.

The golf ball made from the above formulation had the following physical characteristics:

| | |
|---|---|
| PGA Compression | 160 |
| Shore C Durometer | 95 |
| 72" Rebound | 53" |
| Initial Velocity (feet/second) | 237 |

EXAMPLE 13

| PRODUCT | PARTS | FUNCTION |
|---|---|---|
| Adiprene L-213 | 40.00 | urethane prepolymer |
| Adiprene L-420 | 20.00 | urethane prepolymer |
| Adiprene L-955 | 40.00 | urethane prepolymer |
| MOCA | 29.00 | curing agent |

In accordance with the formula given on page six the equivalent mole ratio of isocyanate to curing agent is 0.879:1.

The golf ball made from the above formulation had the following physical characteristics:

| | |
|---|---|
| PGA Compression | 162 |
| Shore C Durometer | 95 |
| 72" Rebound | 50" |
| Initial Velocity (feet/second) | 234 |

EXAMPLE 14

| PRODUCT | PARTS | FUNCTION |
|---|---|---|
| Adiprene L-100 | 100.00 | urethane prepolymer |
| DBEA | 29.2 | plasticizer |
| Oleic Acid | 1.2 | cure retarder |
| Nuocure | 0.6 | catalyst |
| White Paste 22961 | 1.8 | colorant |
| Curithane 126 | 11.2 | curing agent |

In accordance with the formula given on page six the equivalent mole ratio of isocyanate to curing agent is 1.09:1.

The golf ball made from the above formulation had the following physical characteristics:

| | |
|---|---|
| PGA Compression | 28 |
| Shore C Durometer | 69 |
| 72" Rebound | 49" |
| Initial Velocity (feet/second) | 233 |

EXAMPLE 15

| PRODUCT | PARTS | FUNCTION |
|---|---|---|
| Adiprene L-100 | 100.00 | urethane prepolymer |
| DBEA | 29.2 | plasticizer |
| Oleic Acid | 1.2 | cure retarder |
| White Paste 22961 | 1.8 | colorant |
| Curithane 126 | 11.2 | curing agent |

In accordance with the formula given on page six the equivalent mole ratio of isocyanate to curing agent is 1.09:1.

The golf ball made from the above formulation had the following physical characteristics:

| | |
|---|---|
| PGA Compression | 34 |
| Shore C Durometer | 71 |
| 72" Rebound | 49" |
| Initial Velocity (feet/second) | 232 |

The golf balls manufactured in accordance with the above disclosed process with the indicated compositions of matter will have superior cut resistance, color throughout the ball, excellent resilience or rebound and will not age perceptibly due to degradation or discoloration of the composition of matter from which the balls are constructed. Further the click and feel of the golf ball will be substantially the same as golf balls produced by the usual method of wrapping rubber bands about a central core and providing a spherical outer cover therefor.

It will be understood that the claims are intended to cover all changes and modifications of the preferred embodiments of the invention, herein chosen for the purpose of illustration, which do not constitute departures from the spirit and scope of the invention.

What is claimed is:

1. A polyurethane golf ball having the following physical characteristics:

| | |
|---|---|
| Diameter | less than 1.70 inches |
| PGA Compression | at least 25 |
| Hardness Shore "C" Scale | at least 60 |
| Rebound 72 Inch | at least 48 inches |
| Initial Velocity USGA | at least 230 feet/second | prepared from the composition comprising a prepolymer of a polyether and a diisocyanate and a curing agent selected from the group consisting of trifunctional and tetrafunctional polyols and curing agents capable of curing the prepolymer and having at least two reactive amine groups, the prepolymer and the curing agent being present in an equivalent weight ratio of 1:1 ± 20%.

2. The golf ball of claim 1 wherein the PGA Compression is at least 30.

3. The golf ball of claim 1 wherein the diisocyanate is selected from the group consisting of 2,4 tolylene diisocyanate, 4,4' diphenylmethane diisocyanate and 3,3' dimethyl 4,4' biphenyl diisocyanate.

4. The golf ball of claim 1 wherein the polyether is a polyalkylene ether glycol.

5. The golf ball of claim 4 wherein the polyalkylene ether glycol has an average molecular weight of less than 1000 and has from about 4 to about 8 carbon atoms in the alkylene group.

6. The golf ball of claim 5 wherein the polyether is polytetramethylene ether glycol.

7. The golf ball of claim 1 wherein the curing agent is a trifunctional polyol selected from the group consisting of triisopropanol amine and trimethylol propane.

8. The golf ball of claim 1 wherein the curing agent is an amine-type curing agent selected from the group consisting of 3,3'-dichlorobenzidene, 3,3' dichloro, 4,4' diamino diphenyl methane and N,N,N',N' tetrakis (2-hydroxy propyl) ethylene diamine.

9. The golf ball of claim 1 wherein the prepolymer and curing agent are present in an equivalent weight ratio of 1:1 ± 10%.

10. The golf ball of claim 1 further including per 100 parts prepolymer up to about 100 parts by weight of at least one compatible plasticizer.

11. The golf ball of claim 1 further including per 100 parts by weight of prepolymer up to about 100 parts by weight of a filler.

12. The golf ball of claim 1 further including per 100 parts by weight of prepolymer up to about two parts by weight of an ultraviolet light absorber.

13. The golf ball of claim 1 further including per 100 parts by weight of the prepolymer up to about ten parts by weight of an internal lubricant.

14. The golf ball of claim 1 further including per 100 parts by weight of prepolymer up to one part by weight of catalyst.

* * * * *